United States Patent
Ibaraki et al.

(10) Patent No.: US 6,590,865 B1
(45) Date of Patent: Jul. 8, 2003

(54) TRANSMISSION SYSTEM, BANDWIDTH MANAGEMENT APPARATUS, AND BANDWIDTH MANAGEMENT METHOD

(75) Inventors: Susumu Ibaraki, Sakai (JP); Toshikazu Hattori, Kyoto (JP); Toshihiko Kurosaki, Kobe (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/366,038

(22) Filed: Aug. 2, 1999

(30) Foreign Application Priority Data

Jul. 14, 1999 (JP) .......................................... 11-200826
Aug. 4, 1999 (JP) .......................................... 10-220044

(51) Int. Cl.[7] .............................................. H04L 12/56
(52) U.S. Cl. ........................ 370/230; 370/235; 370/236
(58) Field of Search ................................ 370/229, 230, 370/231, 235, 230.1, 395, 468, 329, 348, 349, 442, 448, 232, 233, 236, 236.1, 236.2, 237, 239, 240

(56) References Cited

U.S. PATENT DOCUMENTS

| | | | |
|---|---|---|---|
| 4,404,557 A | | 9/1983 | Grow |
| 5,001,707 A | | 3/1991 | Kositpaiboon et al. |
| 5,043,981 A | * | 8/1991 | Firoozmand et al. ....... 370/235 |
| 5,164,938 A | * | 11/1992 | Jurkevich et al. ........... 370/231 |
| 5,313,454 A | * | 5/1994 | Bustini et al. .............. 370/231 |
| 5,390,182 A | | 2/1995 | Zheng |
| 5,414,697 A | | 5/1995 | Osaki |
| 5,425,019 A | | 6/1995 | Chugo et al. |
| 5,477,542 A | | 12/1995 | Takahara et al. |
| 5,479,404 A | | 12/1995 | Francois et al. |

(List continued on next page.)

FOREIGN PATENT DOCUMENTS

| | | |
|---|---|---|
| EP | 0 756 435 A2 | 1/1997 |
| EP | 0 825 784 A | 2/1998 |
| JP | 5-268250 | 10/1993 |
| JP | 6-46082 | 2/1994 |
| JP | 06334680 A | 2/1994 |

(List continued on next page.)

OTHER PUBLICATIONS

Abraham S P et al: "Max–Min Fair Rate Control of ABR Connections with Nonzero MCRS" IEEE Global Telecommunications Conference, Pheonix, Arizona, Nov. 3–8, 1997, Glgobal Telecommunications Conference (Globecom), New York, IEEE, US, vol. 1, Nov. 3, 1997, pp. 498–502, XP000737583, ISBN: 0–7803–4199–6 *abstract*.

(List continued on next page.)

*Primary Examiner*—Wellington Chin
*Assistant Examiner*—William Schultz
(74) *Attorney, Agent, or Firm*—Burr & Brown

(57) ABSTRACT

There is provided a transmission system which realizes more flexible resource allocation. A resource management means 12, upon receipt of a resource allocation request including a minimum bandwidth and a maximum bandwidth, reduces allocated resources stored in an allocated-resource request table 13 to the corresponding minimum bandwidths. As such, the request is accepted with higher probability. When releasing an allocated resource, the resource management means 12 increases the allocated-resources of the allocated-resource requests to bandwidths within a range of the corresponding maximum bandwidths. Accordingly, the resources are utilized more effectively. When releasing the resource, the resource management means 12 notifies, by broadcast, all the communication apparatuses that free resources are increased. Thus, for the communication apparatus whose request has been rejected, the resource is allocatable.

16 Claims, 13 Drawing Sheets

U.S. PATENT DOCUMENTS

| | | | |
|---|---|---|---|
| 5,502,714 A | | 3/1996 | Sallberg |
| 5,636,212 A | * | 6/1997 | Ikeda .......................... 370/233 |
| 5,677,906 A | * | 10/1997 | Hayter et al. ................ 370/235 |
| 5,689,507 A | * | 11/1997 | Bloks et al. ................. 370/389 |
| 5,701,465 A | * | 12/1997 | Baugher et al. ............ 370/231 |
| 5,719,854 A | * | 2/1998 | Choudhury et al. ........ 370/231 |
| 5,742,592 A | * | 4/1998 | Scholefield et al. ........ 370/329 |
| 5,748,629 A | | 5/1998 | Caldara et al. |
| 5,768,123 A | * | 6/1998 | Maxemchuk ............... 370/231 |
| 5,926,459 A | * | 7/1999 | Lyles et al. .................. 370/230 |
| 5,933,607 A | * | 8/1999 | Tate et al. ............. 370/395.61 |
| 5,940,370 A | | 8/1999 | Curtis et al. |
| 5,982,776 A | * | 11/1999 | Manning et al. ............ 370/235 |

FOREIGN PATENT DOCUMENTS

| | | |
|---|---|---|
| JP | 7-15455 | 1/1995 |
| JP | 7-46267 | 2/1995 |
| JP | 7-226756 | 8/1995 |
| JP | 7-95745 | 10/1995 |
| JP | 8-24303 | 3/1996 |
| JP | 9-46344 | 2/1997 |
| JP | 09046367 A | 2/1997 |
| JP | 9-102787 | 4/1997 |
| JP | 9-130388 | 5/1997 |
| JP | 9-186701 | 7/1997 |
| JP | 10-303925 | 11/1998 |
| JP | 2000-49787 | 2/2000 |
| WO | 96/31036 | 10/1996 |
| WO | 98 31121 A | 7/1998 |

OTHER PUBLICATIONS

Martini P et al: "Connection Oriented Data Service in DQDB Simulation Studies of the Guaranteed Bandwidth Protocol" Proceedings of the International Phoenix Conference on Computers and Communications, Tempe, Mar. 23–26, 1993, New York, IEEE, US, vol. CONF. 12, Mar. 23, 1993, pp. 339–345, XP000370498, ISBN: 0–7803–0922–7 *abstract*.

* cited by examiner

| ID i | minimum bandwidth | maximum bandwidth | allocated bandwidth | priority Pi |
|---|---|---|---|---|
| 1 | 2M | 6M | 6M | 5 |
| 2 | 6M | 6M | 6M | 3 |
| 3 | 6M | 10M | 10M | 6 |
| – | – | – | – | – |
| – | – | – | – | – |
| total | 14M | 22M | 22M | |

Fig.5 (a)

| ID i | minimum bandwidth | maximum bandwidth | allocated bandwidth | priority $P_i$ |
|---|---|---|---|---|
| 1 | 2M | 6M | 6M | 5 |
| 2 | 6M | 6M | 6M | 3 |
| 3 | 6M | 10M | 10M | 6 |
| – | – | – | – | – |
| – | – | – | – | – |
| total | 14M | 22M | 22M | |

Fig.5 (b)

| ID i | minimum bandwidth | maximum bandwidth | allocated bandwidth | priority $P_i$ |
|---|---|---|---|---|
| 1 | 2M | 6M | 4M | 5 |
| 2 | 6M | 6M | 6M | 3 |
| 3 | 6M | 10M | 8M | 6 |
| 4 | 7M | 7M | 7M | 1 |
| – | – | – | – | – |
| total | 21M | 29M | 25M | |

Fig.5 (c)

| ID i | minimum bandwidth | maximum bandwidth | allocated bandwidth | priority $P_i$ |
|---|---|---|---|---|
| – | – | – | – | – |
| 2 | 6M | 6M | 6M | 3 |
| 3 | 6M | 10M | 10M | 6 |
| 4 | 7M | 7M | 7M | 1 |
| – | – | – | – | – |
| total | 19M | 23M | 23M | | number of allocatable remaining slots : 11

| i | Pi | Pi/1 | Pi/2 | Pi/3 | Pi/4 | Pi/5 | slots |
|---|----|------|------|------|------|------|-------|
| 1 | 5  | 5.00 | 2.50 | 1.66 | 1.25 | 1.00 | 2 |
| 2 | 3  | 3.00 | 1.50 | 1.00 | 0.75 | 0.60 | 1 |
| 3 | 6  | 6.00 | 3.00 | 2.00 | 1.50 | 1.20 | 3 |
| 4 | 1  | 1.00 | 0.50 | 0.33 | 0.25 | 0.20 | 0 |
| 5 | 10 | 10.00| 5.00 | 3.33 | 2.50 | 2.00 | 5 |

Fig.14

| ID i | requested bandwidth | allocated bandwidth | priority Pi | apparatus IDs AIDi | sequence number SQi |
|---|---|---|---|---|---|
|  |  |  |  |  |  |
|  |  |  |  |  |  |
|  |  |  |  |  |  |
|  |  |  |  |  |  |
|  |  |  |  |  |  |

TRANSMISSION SYSTEM, BANDWIDTH MANAGEMENT APPARATUS, AND BANDWIDTH MANAGEMENT METHOD

FIELD OF THE INVENTION

The present invention relates to a transmission system in which a bus-type or a loop-type transmission line is shared among plural communication apparatuses and data transmission is performed by using isochronous communication channels with bandwidths ensured. The present invention also relates to a bandwidth (resource) management apparatus and a bandwidth (resource) management method which are used in the transmission system, for managing resources such as the bandwidths or time slots for the transmission system.

BACKGROUND OF THE INVENTION

As a conventional resource management method, there is a method used by a bus-type network according to an IEEE(Institute of Electrical and Electronics Engineers) 1394 High Performance Serial Bus (IEEE 1394) standard. As for the IEEE1394, articles as well as standard textbooks have been published, for example, Japanese articles appearing in the Interface(published in Japan) 1996, April, or the Interface 1997, (published in Japan) January.

FIG. 9 shows a transmission system which realizes the conventional resource management method. In FIG. 9, 81 denotes a resource management table, 82-1, 82-2, and 82-3 denote communication apparatuses, and 31 denotes a transmission line.

The communication apparatuses 82-1, 82-2, and 82-3 use an isochronous communication channel which ensures bandwidths or an asynchronous communication channel which does not ensure the bandwidths, to transmit data. Each of these communication apparatuses can freely determine which of the isochronous communication channel and the asynchronous communication channel is to be used by itself. In general, the isochronous communication channel is used to transmit data of a large capacity which requires isochronous transmission, such as video data or audio data, while the asynchronous communication channel is used to transmit data of a small capacity which does not require isochronous transmission, such as command or file transfer.

There is one resource management table 81 on the transmission line 31, which contains contents of allocation of network resources as the isochronous communication channels. The contents of resource allocation stored in the resource management table 81 can be overwritten for each of the communication apparatuses by communication using the asynchronous communication channel. The resource management table 81 contains the sum total of free bandwidths which are available as the isochronous communication channels, that is, which are not allocated to any communication apparatuses, BANDWIDTH_AVAILABLE (BW_A). The communication apparatus 82-1, before starting data transmission using the isochronous communication channel, obtains a bandwidth to-be-ensured from BW_A as a resource to-be-ensured, and performs data transmission by using the ensured bandwidth. In this case, if the resource to-be-ensured exceeds the BW_A, the apparatus 82-1 cannot be ensured the bandwidth. When data transmission is completed and the resource is released, the released bandwidth is added to the BW_A. The above operation enables to allocate the bandwidth required for the communication apparatus 82-1.

FIG. 10 schematically shows a data transmission format according to IEEE1394. In FIG. 10, reference numerals 91, 92, and 93 denote a cycle start, an isochronous packet, and an asynchronous packet, respectively. The format shown in FIG. 10 illustrates a transmission format of one cycle as a basic unit for IEEE1394 transmission. This cycle is repeated to implement data transmission. One cycle is 125 micro seconds starting from the cycle start 91. The isochronous packet 92 which implements data transmission using the isochronous channel and the asynchronous packet 93 which implements transmission using the asynchronous communication channel are used as packets to-be-transmitted. The maximum length of the isochronous packet which can be transmitted by the communication apparatus in each cycle is assumed to be an arbitrary length below a value determined by the ensured bandwidth which is obtained from the resource management table 81. Thereby, respective communication apparatuses can share the transmission line by using set respective bandwidths.

Hence, according to the conventional transmission system, the bandwidth ensured in advance by each of the communication apparatuses is ensured until the end of communication with no change made. This is suitable for data transmission which requires that a constant bandwidth be always ensured. Such data is defined as CBR (constant bit rate) data. On the other hand, when transmitting a file or map data of a large capacity, isochronous transmission is not required but bandwidths needs to be ensured because of its large capacity, and therefore the isochronous communication channel is used to perform data transmission. Such non-isochronous data of a large capacity is defined as ABR (available bit rate)data. The ABR data has a request relating to the maximum bandwidth and the minimum bandwidth, and demands to ensure an arbitrary bandwidth between the maximum bandwidth and the minimum bandwidth. When transmitting the ABR data, a data rate of the data to-be-transmitted can be changed according to the ensured bandwidth. However, when transmitting the ABR data by using the isochronous communication channel in the conventional transmission system, a bandwidth which was initially ensured is used to perform data transmission. As a consequence, the bandwidth cannot be allocated flexibly.

SUMMARY OF THE INVENTION

The present invention is directed to solving the above problem, and an object of the present invention is to provide a transmission system which is capable of allocating resources more flexibly.

Other objects and advantages of the invention will become apparent from the detailed description that follows. The detailed description and specific embodiments described are provided only for illustration since various additions and modifications within the spirit of and scope of the invention will be apparent to those skill in the art from the detailed description.

According to a first aspect of the present invention, there is provided a transmission system comprising a transmission line, a communication apparatus connected to the transmission line, and a bandwidth management apparatus for managing bandwidths on the transmission line, wherein the communication apparatus, when performing isochronous data transmission by using an allocated resource on the transmission line, outputs a resource allocation request including information indicating a minimum bandwidth and a maximum bandwidth to the bandwidth management apparatus before the isochronous data transmission, and wherein the bandwidth management apparatus includes an allocated-resource request table for storing plural allocated-resource requests; and resource management means which decides whether or not sum of minimum bandwidths of all allocated-resource requests stored in the allocated-resource request table and a minimum bandwidth of the resource allocation request is allocatable from resources on the transmission line when receiving the resource allocation request as an input, allocates a resource for each of the all allocated-resource requests and the resource allocation request such that a bandwidth between a corresponding minimum bandwidth and a corresponding maximum bandwidth is allocated when deciding that the sum is allocatable, and writes the minimum bandwidth and an allocated bandwidth of the resource allocation request in the allocated-resource request table as an allocated-resource request. Therefore, when making the resource allocation request, resource allocation for the request is performed with higher probability.

According to a second aspect of the present invention, in the transmission system of the first aspect, the resource management means, when an allocated resource of at least one allocated-resource request stored in the allocated-resource request table is released, reallocates a free resource for each of allocated-resource requests other than the at least one allocated-resource request with the allocated resource released such that a bandwidth which is not larger than a corresponding maximum bandwidth is obtained. Therefore, the resource can be utilized effectively.

According to a third aspect of the present invention, in the transmission system of the first aspect, the resource management means, when allocating the resource such that the bandwidth between the corresponding minimum bandwidth and the corresponding maximum bandwidth is allocated, performs control so that a ratio of an allocated bandwidth to a corresponding maximum bandwidth for a first request of a priority is higher than a ratio of an allocated bandwidth to a corresponding maximum bandwidth for a second request of a priority lower than the priority of the first request. Therefore, a larger bandwidth is allocated for a request of a higher priority.

According to a fourth aspect of the present invention, there is provided a transmission system comprising a transmission line, plural communication apparatuses connected to the transmission line, and a bandwidth management apparatus for managing bandwidths on the transmission line, wherein a communication apparatus included in the plural communication apparatuses, when performing isochronous data transmission by using an allocated resource on the transmission line, outputs a resource allocation request to the bandwidth management apparatus before the isochronous data transmission, and outputs the resource allocation request again upon receipt of free resource increase notification, when negative acknowledgement is sent to the communication apparatus in response to the resource allocation request, and wherein the bandwidth management apparatus manages resources on the transmission line, sends the negative acknowledgement to the communication apparatus when resource allocation for the resource allocation request from the communication apparatus is impossible, and notifies all the communication apparatuses that free resources are increased, by broadcast, when an allocated resource is released. Therefore, for the communication apparatus whose request has been once rejected, the resource can be allocated later.

According to a fifth aspect of the present invention, there is provided a transmission system comprising a transmission line, plural communication apparatuses connected to the transmission line, and a bandwidth management apparatus for managing bandwidths on the transmission line, wherein a communication apparatus included in the plural communication apparatuses, when performing data transmission by using an allocated resource on the transmission line, outputs a resource allocation request including a priority to the bandwidth management apparatus before the data transmission, and wherein the bandwidth management apparatus manages resources on the transmission line in such a way that it releases resources allocated for another communication apparatuses and allocates the resources for the resource allocation request, when resource allocation for the resource allocation request from the communication apparatus is impossible and the priority of the resource allocation request is the highest. Therefore, for data transmission with higher urgency, the resource allocation is always performed.

According to a sixth aspect of the present invention, there is provided a transmission system comprising a transmission line, at least two communication apparatuses connected to the transmission line, and a bandwidth management apparatus for managing bandwidths on the transmission line, the transmission line being divided into time slots at regular intervals, wherein each of the at least two communication apparatuses, includes resource request means which outputs a resource allocation request to the bandwidth management apparatus before isochronous data transmission, for performing the isochronous data transmission by using an allocated resource on the transmission line; and delay means which stores data input externally and then outputs the data toward the transmission line, for transmitting the data toward the transmission line, and stores data received through the transmission line and then outputs the data externally, for receiving the data through the transmission line, and wherein the bandwidth management apparatus receives the resource allocation request, and when allocating a resource for the resource allocation request, verifies that the delay means of the communication apparatus will not overflow when the resource is allocated. Therefore, variances of data arrival times due to data transmission can be compensated for with fewer memories.

According to a seventh aspect of the present invention, there is provided a bandwidth management apparatus for managing resources on a transmission line and processing a resource allocation request including information indicating a minimum bandwidth and a maximum bandwidth, which comprises: an allocated-resource request table for storing plural allocated-resource requests; and resource management means which decides whether or not sum of minimum bandwidths of all allocated-resource requests stored in the allocated-resource request table and a minimum bandwidth of the resource allocation request is allocatable from the resources on the transmission line when receiving the resource allocation request as an input, allocates a resource for each of the allocated-resource requests and the resource allocation request such that a bandwidth between a corresponding minimum bandwidth and a corresponding maximum bandwidth is allocated when deciding that the sum is allocatable, and writes the minimum bandwidth and an allocated bandwidth of the resource allocation request in the allocated-resource request table as an allocated-resource request. Therefore, when making the resource allocation request, resource allocation for the request is performed with higher probability.

According to an eighth aspect of the present invention, there is provided a bandwidth management apparatus for managing resources on a transmission line and processing a resource allocation request, which comprises: means for broadcasting free resource increase notification through the transmission line when an allocated resource is released. Therefore, for the communication apparatus whose request has been once rejected, the resource can be allocated later.

According to a ninth aspect of the present invention, there is provided a bandwidth management apparatus for managing resources on a transmission line and processing a resource allocation request including a priority, which comprises: means which releases an allocated resource when resource allocation for the resource allocation request is impossible and the priority of the resource allocation is the highest, and performs resource allocation for the resource allocation request. Therefore, for data transmission with higher urgency, the resource allocation is always performed.

According to a tenth aspect of the present invention, there is provided a bandwidth management apparatus which is applied to a transmission system comprising a transmission line, and at least two communication apparatuses connected to the transmission line which is divided into time slots at regular intervals, for managing allocation of the time slots and processing a resource allocation request, which comprises: means which verifies that delay means for delaying data in a communication apparatus of the at least two communication apparatuses will not overflow, when it allocates the time slots for the resource allocation request and the communication apparatus transmits data by using the time slots allocated for itself. Therefore, variances of data arrival times due to data transmission can be compensated for with fewer memories.

According to an eleventh aspect of the present invention, there is provided a bandwidth management method for managing resources on a transmission line by using an allocated-resource request table for storing plural allocated-resource requests, which comprises: deciding whether or not sum of minimum bandwidths of all allocated-resource requests stored in the allocated-resource request table and a minimum bandwidth of the resource allocation request is allocatable from the resources on the transmission line when receiving the resource allocation request as an input; and allocating a resource for each of the all allocated-resource requests and the resource allocation request such that a bandwidth between a corresponding minimum bandwidth and a corresponding maximum bandwidth is allocated when deciding that the sum is allocatable, and writing the minimum bandwidth and an allocated bandwidth of the resource allocation request in the allocated-resource request table as an allocated-resource request. Therefore, when making the resource allocation request, resource allocation for the request is performed with higher probability.

According to a twelfth aspect of the present invention, there is provided a bandwidth management method for managing resources on a transmission line to which plural communication apparatuses are connected, wherein when an allocated resource is released, all of the plural communication apparatuses are notified that free resources are increased, by broadcast. Therefore, for the communication apparatus whose request has been once rejected, the resource can be allocated later.

According to a thirteenth aspect of the present invention, there is provided a bandwidth management method for managing resources on a transmission line, which comprises: an allocation decision step for deciding whether or not a resource is allocatable for a resource allocation request when receiving the resource allocation request including a priority as an input; a priority decision step for deciding whether or not the priority of the resource allocation request is not smaller than a predetermined value when it is decided that the resource is not allocatable for the resource allocation request in the allocation decision step; and a release step for releasing an allocated resource when the priority is not smaller than the predetermined value, and returning to the allocation decision step. Therefore, for data transmission with higher urgency, the resource allocation is always performed.

According to a fourteenth aspect of the present invention, there is provided a band management method which is applied to a transmission system comprising a transmission line and at least two communication apparatuses, the at least two communication apparatuses each including delay means for delaying data and the transmission line being divided into time slots at regular intervals, and which is used for managing the time slots, and the method comprises: a step for verifying that the delay means of a communication apparatus which will transmit data, included in the at least two communication apparatuses, will not overflow, when the time slots are allocated for a resource allocation request received as an input, and the communication apparatus transmits data by using the time slots allocated for itself. Therefore, variances of data arrival times due to data transmission can be compensated for with fewer memories.

BRIEF DESCRIPTION OF THE DRAWINGS

FIGS. 5(a)–5(c) are diagrams for explaining processing performed by resource management means of the first embodiment.

FIG. 14 is a diagram showing an example of an allocated-resource request table according to a third embodiment of the present invention.

DETAILED DESCRIPTION OF THE INVENTION

Now, preferred embodiments of the present invention will be described with reference to drawings.

EMBODIMENT 1

Figure 1:
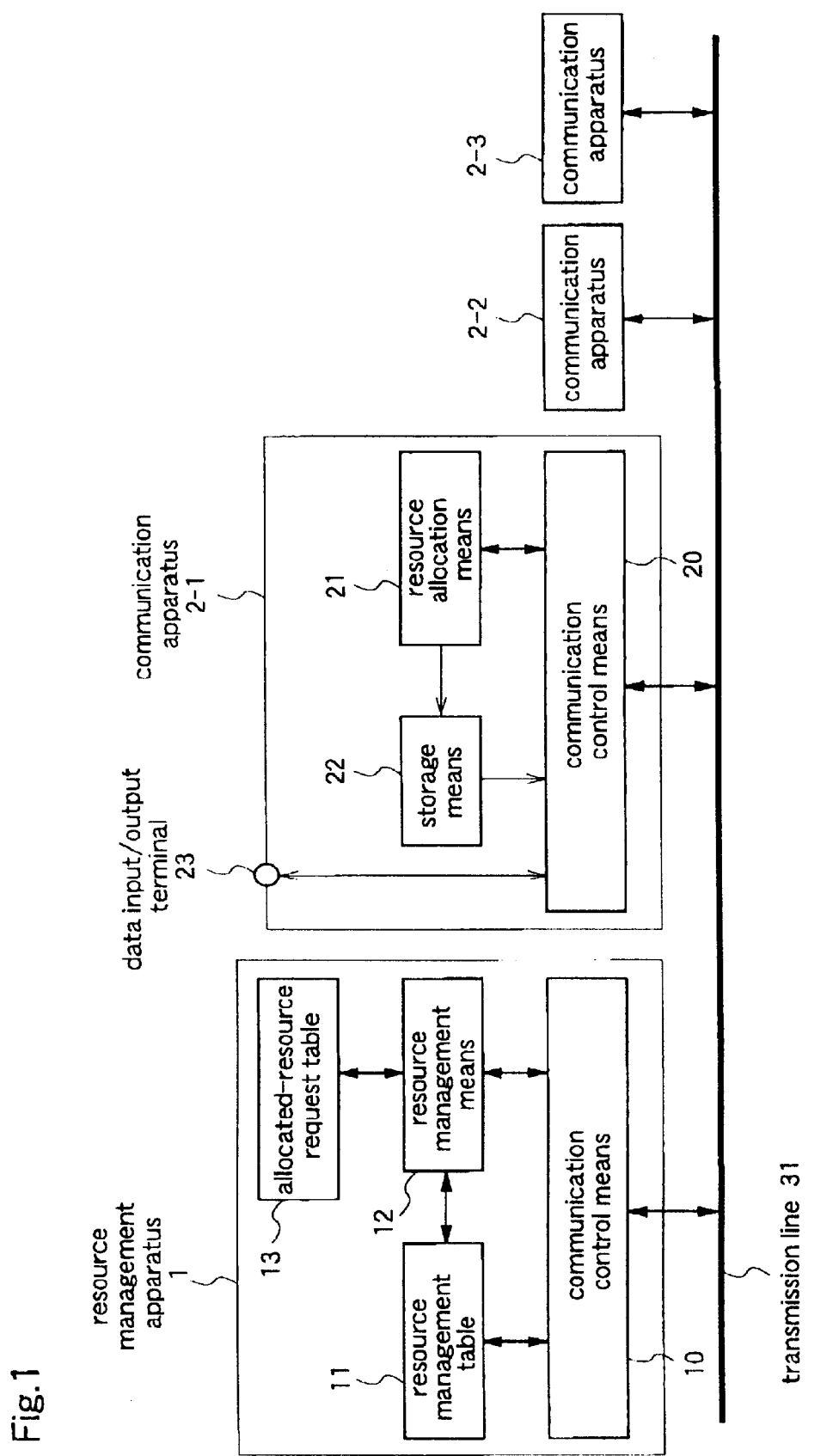
FIG. 1 is a diagram showing a transmission system according to a first embodiment of the present invention.

Hereinafter, a transmission system, a resource (bandwidth) management apparatus, and a resource (bandwidth) management method according to a first embodiment of the present invention, will be described. FIG. 1 shows the transmission system including the resource management apparatus of the first embodiment. In FIG. 1, reference numerals 1, 10, 11, 12, and 13 denote a resource management apparatus, communication control means, a resource management table, resource management means, and an allocated-resource request table, respectively. Reference numerals 2-1, 2-2, and 2-3 denote communication apparatuses, respectively. Reference numerals 20, 21, 22, 23, and 31 denote communication control means, resource allocation means, storage means, a data input/output terminal, and a transmission line, respectively.

In this embodiment, IEEE1394 system described in the conventional example is employed as a data transmission method. But this is only illustrative and the resource management method and the resource management apparatus of the present invention may employ an arbitrary transmission system using the isochronous communication channel which ensures the bandwidth.

In the communication apparatus 2-1, the communication control means 20 transmits data input via the data input/output terminal 23 to another communication apparatus through the transmission line 31. Or, the communication control means 20 receives data transmitted from another communication apparatus through the transmission line 31 and outputs the data via the data input/output terminal 23. In this case, the data is transmitted or received by using the isochronous communication channel which ensures the bandwidth or the asynchronous communication channel which does not ensure the bandwidth. The communication control means 20 is communication control means according to IEEE1394, and is adapted to transmit isochronous packets through the isochronous communication channel and transmit asynchronous packets through the asynchronous communication channel. The resource allocation means 21 is used for performing processing to allocate the resource prior to transmission using the isochronous communication channel. The resource allocation means 21 serves as means for performing processing to allocate a network resource available by the communication apparatus 2-1, which resource allocation process will be discussed in detail later. Information of the available resource resulting from the resource allocation process by the resource allocation means 21 is stored in the storage means 22. The communication control means 20 uses the information of the resource stored in the storage means 22 to transmit data by using the isochronous communication channel. According to IEEE1394, the information of the available bandwidth is stored in the storage means 22 as the available network resource, and the communication control means 20 sets a packet length of the isochronous packet to-be-transmitted in each cycle to be not larger than a packet length corresponding to the available bandwidth.

The same goes for the communication apparatuses 2-2 and 2-3. In description below, operation of the communication apparatus 2-1 will be described, although the number of the communication apparatuses is not limited to three, for example, an arbitrary number of communication apparatuses may be connected to the transmission line 31.

The resource management apparatus 1 is an apparatus used for managing network resources used as the isochronous communication channel on the transmission line 31, which allocates a network resource to the communication apparatus 2-1. The resource management table 11 is a table which contains information for distinguishing between allocated resources and unallocated resources, and is identical to the table described in the conventional example. The resource management means 12 is adapted to receive a request for resource allocation through the communication control means 10 and allocate a resource in response to the request. Operation of the resource management means 12 will be described in detail in later.

Operations of the resource allocation means 21 and the resource management means 12 will now be described.

Between the resource allocation means 21 and the resource management means 12, communication is made through the communication control means 20, the transmission line 31, and the communication control means 10, for allocation of the network resource. This communication is made by using the asynchronous communication channel, but may be performed by using the isochronous communication channel, an arbitrary channel or an arbitrary method which implements the communication. In addition, without the use of the communication control means 10, the transmission line 31, and the communication control means 20, another transmission line, on which the above data transmission is not performed, may be used to perform the communication.

In communication for this resource allocation, the following (1)–(5) requests and responses (answers) to them, or notifications are transmitted or received.

(1) Resource Allocation Request

The resource allocation means 21 requests the resource management means 12 to ensure a resource. The resource allocation request comprises the maximum bandwidth, the minimum bandwidth, and a priority. The resource management means 12 responds to the resource allocation means 21 by sending ACK (acknowledgement) when it has ensured the resource, and responds by sending NACK (negative acknowledgement) when it cannot ensure the resource. The ACK includes the allocated bandwidth actually ensured by the resource management means 12. According to IEEE1394, allocated resources are allocated bandwidths. The resource allocation request is made for the CBR (constant bit rate) which requests a fixed bandwidth and the ABR (available bit rate) which requests a bandwidth between the minimum bandwidth and the maximum bandwidth. As for the CBR, the maximum bandwidth and the minimum bandwidth are set such that they have the same value.

(2) Resource Release Request

The resource allocation means 21 requests the resource management means 12 to release (free) the resource, that is, requests the resource management means 12 to give up the resource allocation for the requested resource.

(3) Change Notification

The resource management means 12 notifies the resource allocation means 21 that a resource allocated to the resource allocation means 21 has been changed. The change notification includes an allocated resource after change.

(4) Free Resource Increase Notification

The resource management means 12 notifies every resource allocation means 21 that free resources are increased. This notification may include a total amount of the free resources. Preferably, the free resource increase notification is transmitted by broadcast. Broadcast data refers to data which can he received by all the apparatuses connected to the transmission line 31, which is generally transmitted in the form of a broadcast packet having a predetermined broadcast address.

(5) Unexpected Release Notification

The resource management means 12 notifies the resource allocation means 21 that the resource allocated to the resource allocation means 21 has been released, that is, the resource management means 12 has given up the resource allocated to the resource allocation means 21 without a resource release request from the resource allocation means.

How the resource allocation means 21 and the resource management means 12 operate according to the above information (1)–(5), will be explained.

Operation of Resource Allocation Means 12

Prior to transmission of isochronous data, the resource allocation means 21 outputs the resource allocation request. After this transmission is finished, the resource allocation means 21 outputs the resource release request. When it is imperative that the resource be allocated, including a case where the synchronous data should be transmitted with high urgency, its priority is set to the highest. The priority of a request for more significant resource allocation is set higher. When the unexpected release notification is input or the response to the resource allocation request is "NACK", the resource allocation means 21 waits for the free resource increase notification. Upon receipt of the free resource increase notification as an input, the resource allocation means 21 outputs the resource allocation request again.

Operation of Resource Management Means 12

Receiving the resource allocation request, the resource management means 12 allocates a resource on the transmission line according to the request, and stores a resource allocation request of an allocated resource, i.e., an allocated-resource request, in the allocated-resource request table 13. Receiving the resource allocation request, the resource management means 12 decides whether or not the sum of minimum bandwidths of all allocated-resource requests which are stored in the table 13 and a minimum bandwidth of the input resource allocation request can be ensured from all resources managed by the resource management means 12. In this case, when the available value of allocatable resource is discrete, the minimum bandwidths are replaced by the smallest values among values of allocatable resources, which are not smaller than the requested minimum bandwidths, and then the sum is calculated. This may be performed otherwise when an entity which transmits the resource allocation request selects the minimum bandwidth within the limit. When it decides that the sum can be ensured, for all the allocated-resource requests and the input resource allocation request, the resource management means 12 allocates resources corresponding to bandwidths between the minimum bandwidths and the maximum bandwidths, and sends the "ACK", or otherwise, it sends the "NACK". When it receives the resource release request as an input, for allocated-resource requests except the request of the released allocated-bandwidth, the resource management means 12 reallocates resources such that bandwidths which are not larger than the corresponding maximum bandwidths are obtained, and transmits the free resource increase notification to all the communication apparatuses by broadcast. When the resource is not allocated for a resource allocation request of the highest priority, the resource management means 12 releases one or more allocated resources.

The resource allocation means 21 and the resource management means 12 are realized by using arbitrary construction of the above operation, an arbitrary processor or a program which implements the above processing. Specific implementations of processing performed by the resource allocation means 21 and the resource management means 12 will be described in more detail with reference to drawings, although the processing is not limited to these.

Figures 3, 4:
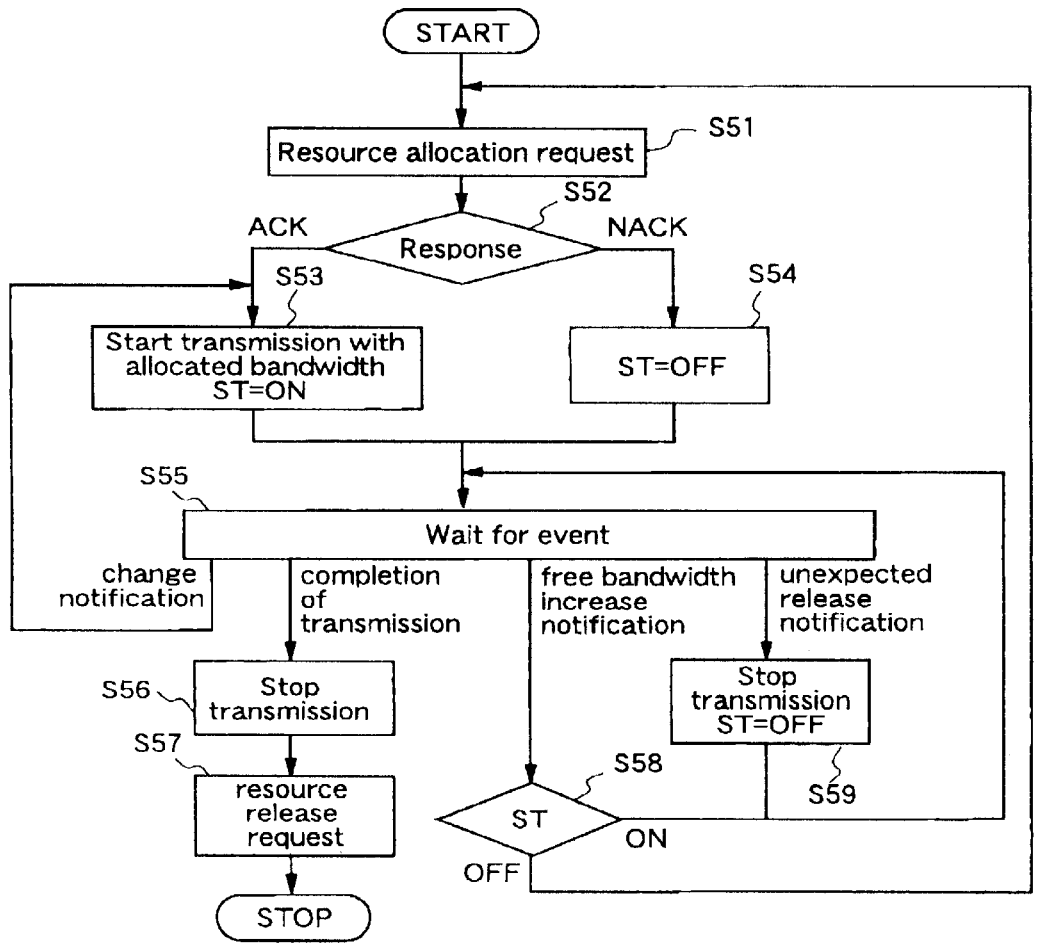
FIG. 3 is a flowchart showing processing performed by resource allocation means of the first embodiment.
FIG. 4 is a diagram showing an allocated-resource request table of the first embodiment.

FIG. 3 is a flowchart showing processing performed by the resource allocation means 21. Along flow in FIG. 3, operation of the resource allocation means 21 will be described in more detail. Here it is assumed that "ST" is a variable represented as "ON" when the resource is allocated and represented as "OFF" when it is not.

As mentioned previously, when transmitting data by using the asynchronous communication channel, the resource allocation means 21 starts operation prior to the transmission. Initially, the resource allocation means 21 makes a resource allocation request (S51). In S51, the resource allocation means 21 transmits the resource allocation request comprising a maximum bandwidth and a minimum bandwidth of a resource to be ensured for data to-be-transmitted by using the isochronous communication channel, and its priority, to the resource management means 12. Then, the resource allocation means receives a response from the resource management means 12 (S52).

When the response is "ACK", the resource allocation means 21 starts transmission by using an allocated bandwidth, and sets the variable ST to ON (S53). The allocated bandwidth has a value included in the "ACK" or change notification, which is stored in the storage means 22. The communication control means 20 uses this allocated bandwidth to perform data transmission through the isochronous communication channel.

When the response is "NACK" in S52, the resource allocation means 21 sets the variable ST to OFF (S54).

After S53 and S54, the resource allocation means 21 waits for the occurrence of an event (S55). The event occurs when the data transmission using the isochronous communication channel is completed or the resource allocation means 21 receives the notification from the resource management means 12. As mentioned previously, the notification includes the change notification, the free bandwidth increase notification, or the unexpected release notification. Processing to-be-performed differs from event to event.

i) Change Notification

When the event is a "change notification" in S55, S53 is performed. Specifically, the resource allocation means 21 makes changes according to the allocated bandwidth included in the change notification, and starts transmission by using the changed bandwidth.

ii) Unexpected Release Notification

When the event is an "unexpected release notification" in S55, the resource allocation means 21 stops data transmission through the asynchronous communication channel and sets the variable ST to OFF (S59). Then, again S55, the resource allocation means 21 waits for the following event.

Free Resource Increase Notification

When the event is the "free resource increase notification" in S55, the resource allocation means 21 decides whether the variable ST in ON or OFF (S58). When it decides that the ST in ON in S58, in S55, the resource allocation means 21 waits for the following event, or otherwise, in S51, the resource allocation means 21 makes a resource allocation request if necessary.

iv) Completion of Transmission

When the event is "completion of transmission" in S55, after stopping data transmission through the asynchronous communication channel (S56), the resource allocation means 21 makes a resource release request (S57), whereby the resource allocation process is completed.

While the above description has been given of the processing by the resource allocation means 21, resource allocation means included in the communication apparatuses 2-2 and 2-3 operate in the same manner.

Figure 2:
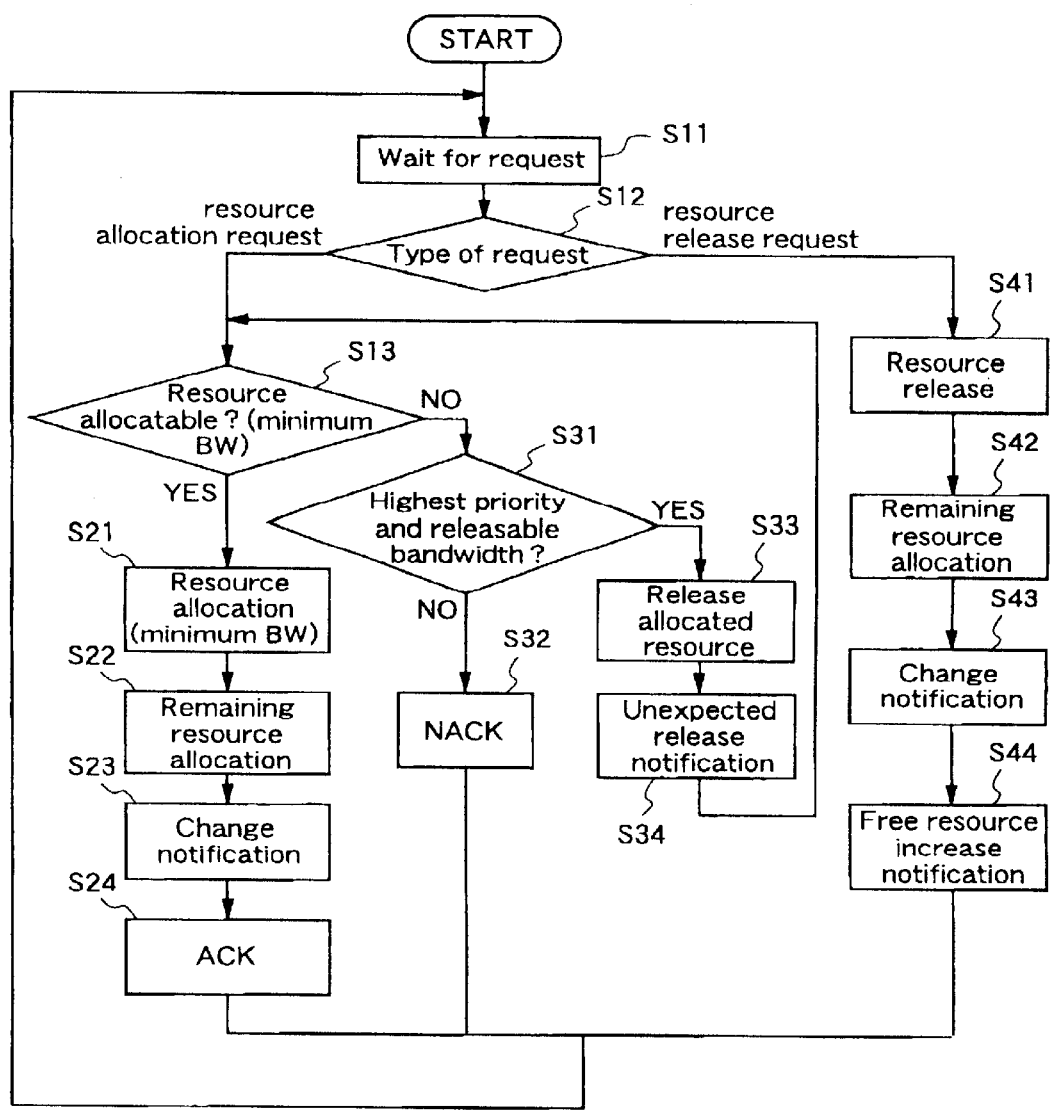
FIG. 2 is a flowchart showing processing performed by resource management means of the first embodiment.

FIG. 2 is a flowchart showing processing performed by the resource management means 12. This flowchart shows an implementation of the resource management method of the present invention. FIG. 4 is a diagram showing the allocated-resource request table 13. Hereinafter, operation of the resource management means 12 will be described with reference to FIGS. 2 and 4.

First, the allocated-resource request table 13 will be described with reference to FIG. 4. The table 13 is used for storing resource allocation requests after the resource management means 12 has ensured the resources as allocated-resource requests, and contains identifiers (ID) for identifying apparatuses, minimum bandwidths, maximum bandwidths, and priorities of the resource allocation requests, and actually allocated resources. Requests for which allocation is not performed, that is, the "NACK" is given, are not stored in the table 13. The IDs are used for identifying the communication apparatuses and may be added by the resource management apparatus when the resource allocation requests are made, or may be created from IDS of the corresponding transmission apparatuses themselves.

How the requests are entered into the table 13 is illustrated by means of examples shown in FIGS. 5(a)–5(c). Here, assume that the minimum unit of the allocatable bandwidth resource is 1 Mbps, and 25 allocations are possible. In other words, bandwidths of 25 Mbps are allocatable. The minimum unit of the bandwidth resource, i.e., 1 Mbps, is termed a "slot".

FIG. 5(a) shows an initial state. The table in FIG. 5(a) contains an allocated-resource request comprising a minimum bandwidth 2 Mbps, a maximum bandwidth 6 Mbps, and an allocated bandwidth 6 Mbps of ID=1, an allocated-resource request comprising a minimum bandwidth 6 Mbps, a maximum bandwidth 6 Mbps, and an allocated bandwidth 6 Mbps of ID=2, and an allocated-resource request comprising a minimum bandwidth 6 Mbps, a maximum bandwidth 10 Mbps, and an allocated bandwidth 10 Mbps of ID=3. The sum of the maximum bandwidths is 22 Mbps, which is below the allocatable bandwidth 25 Mbps. Hence, the allocated bandwidths of all the requests are set to the maximum bandwidths.

Turning to FIG. 5(b), a resource allocation request comprising a minimum bandwidth 7 Mbps, and a maximum bandwidth 7 Mbps of ID=4 is input. In this case, the sum of the minimum bandwidths is 21 Mbps, which is below 25 Mbps, and therefore, is allocatable. The remaining bandwidths 4 Mbps, resulting from allocation of the minimum bandwidths, are allocated such that 2 Mbps is allocated for each of the requests comprising the minimum bandwidth and the maximum bandwidth of IDs 1 and 3. Arbitrary allocation may be performed as long as the maximum bandwidth is not exceeded. For instance, 1 Mbps and 3 Mbps may be allocated to them, respectively. As a result, an allocated-resource request of ID=4 is set in the table 13 as can be seen from the table shown in FIG. 5(b). As for the requests of IDs=1 and 3, the corresponding allocated bandwidths have been changed, and therefore, change notification is performed.

Subsequently, assume that a resource release request for the allocated-resource request of the ID=1 is input. In this case, 2 Mbps of the remaining bandwidths is allocated for the allocated-resource request of ID=3 in which the allocated bandwidth has not reached the corresponding maximum bandwidth, and thereby the allocated bandwidth of ID=3 is set to 10 Mbps (see FIG. 5(c)). As for the allocated-resource request of ID=3, the allocated bandwidth has been changed, and therefore change notification is performed.

Operation of the resource management means 12 will be described with reference to FIG. 2.

Initially, the resource management means 12 waits for a request (S11). This request is the resource allocation request or the resource release request from the resource allocation means 21 of a communication apparatus. Next, the resource management means 12 identifies a type of the request (S12).

When the request is the resource allocation request in S12, the resource management means 12 decides whether or not the resource is allocatable (S13). In this case, the resource management means 12 decides whether or not the sum of a minimum bandwidth of the input request and minimum bandwidths of all the requests stored in the table 13 is allocatable from the total amount of the allocatable network resources. When the sum is larger than the total amount, it is decided "No", while when the sum is equal to or smaller than the total amount, it is decided "Yes".

When decided "Yes" in S13, that is, the sum is allocatable, resource allocation is carried out (S21). In S21, initially, all the set bandwidths, i.e., the allocated bandwidths of all the request stored in the table 13 are changed into the corresponding minimum bandwidths, and correspondingly the contents of table 11 is changed. Then, the resource allocation request is entered into the table 13. In this case, the minimum bandwidth is set as the allocated bandwidth. Then, the remaining allocatable resources are used to perform the remaining resource allocation (S22). In S22, the remaining allocatable resources are allocated for the allocated-resource requests stored in the table 13 such that bandwidths which are not larger than the corresponding maximum bandwidths are obtained. How the remaining resources are allocated for the requests may be implemented according to arbitrary methods. For instance, the remaining resources may be allocated in the order of descending priorities of the requests such that allocated bandwidths which are not larger than the respective maximum bandwidths are obtained, or may be allocated in proportion to the value of the maximum bandwidth. Or, they may be allocated uniformly for all the requests. Thereafter, the resource management means 12 notifies the resource allocation means 21, which transmitted the request whose allocated bandwidth has been changed, among the requests stored in the table 13 that change has been made (S23). Then, the resource management means 12 responds to the resource allocation means 21 which made the resource allocation request by sending the "ACK" (S24). In S24, the resource management means 12 decides the resource allocation means 21 to which it will transmit the "ACK", according to the ID number. Then, the resource management means 12 waits for another request from resource allocation means 21(S11). The resource management means 12 sends "ACK" in response to the resource allocation request after it notifies the resource allocation means 21 that a change has been made in S23, whereby the allocated resources are first reduced and then a new allocation is performed. For higher reliability, the resource allocation means 21 sends the "ACK" in response to the change notification, and the resource management means 12 confirms all "ACK" of change notifications, followed by processing in S24.

When decided "No" in S13, that is, the sum is not allocatable, that is, allocation is impossible, the resource management means 12 decides whether or not the priority of the resource allocation request is the highest and whether there is a releasable bandwidth (S31).

When decided "No" in S31, that is, the priority is not the highest, the resource management means 12 sends the "NACK" to the resource allocation means 21 which made the resource allocation request (532). Then, the resource management means 12 waits for another request from resource allocation means 21 (S11).

When decided "Yes" in S31, that is, the priority is the highest, the resource management means 12 releases the allocated resource of at least one request (S33). In S33, the allocated resource of any of the requests stored in the table 13 is released. Preferably, as the request of the allocated resource to-be-released, the request of the lowest priority is generally selected, although an arbitrary request may be released. Then, the resource management means 12 sends unexpected release notification to the resource allocation means 21 which transmitted the request of the released allocated-resource (S34). In S34, the resource management means 12 decides the resource allocation means 21 which is to be notified of the release, according to the ID number. Then, in S13, the resource management means 12 decides again whether or not the resource is allocatable.

When the request is the resource release request in S12, the resource management means 12 releases the resource according to this request (S41). In S41, according to the ID stored in the table 13, the allocated-resource request indicated by the resource release request is selected, and deleted from the table 13. Simultaneously, the allocated resource corresponding to the released resource is reduced from the table 11, to increase the available resources. Then, the remaining resource allocation is performed (S42). In S42, processing is performed in the same manner as S22. Then, change notification is performed (S43). In S43, processing is performed in the same manner as S24. Then, the free resource increase notification is transmitted to all the resource allocation means 21 on the transmission line 31 by broadcast (S44). Then, the resource management means 12 waits for another request from resource allocation means 21 (S11)

With the above construction, many effects are achieved, which are summarized as follows.

The resource allocation means 21 requests the maximum bandwidth and the minimum bandwidth in S51 (bandwidth allocation request). In S13, the resource management means 12 decides whether or not the resource is allocatable for the request after the set allocated-bandwidths are reduced to the minimum bandwidths, and thereby more resources can be allocated for the request in contrast with a case where decision is made according to the allocated bandwidths. Thereafter, in S22, the remaining resources are allocated for the existing set requests such that bandwidths which are not larger than the corresponding maximum bandwidths are obtained. As for change of allocation, the resource management means 12 notifies the resource allocation means 21 that change has been made (change notification in S23), and the resource allocation means 21 changes the allocated bandwidth (S53). Thus, in response to the resource allocation request including the maximum bandwidth and the minimum bandwidth, the resource allocation is performed with higher possibility, resulting in effective use of the resources.

The resource management means 12 also allocates the remaining resources (S42) and performs change notification (S43) when releasing the resource. Therefore, the resource is utilized more effectively without wasting the free resource under the release.

The resource management means 12 notifies all the resource allocation means that the free resources are increased when releasing the resource (Free Resource Increase Notification S44). Receiving the free resource increase notification, when decided that the ST is OFF in S58, the resource allocation means 21 makes the resource allocation request again. The ST is OFF when the response to the resource allocation request is "NACK" (S54) or when the unexpected release notification is received (S59). In other words, if the resource has not been ensured for data transmission, the resource can be ensured later. Although the request might be rejected again, timing at which the resource would be ensured is known, and therefore, ensuring the resource need not be given up. In contrast with a case where the resource allocation means 21 sends a request after it waits during a fixed time period, the resource can be ensured with higher reliability. Thus, the resource can be allocated later to the communication apparatus, whose request for resource allocation is once rejected.

The resource management means 12 decides whether or not the priority is the highest (S31) when the resource allocation is impossible. When it decides that the priority is the highest, the resource management means 12 releases the allocated resource (S33), and then makes a decision on resource allocation (S13). Thereby, for the resource allocation request relating to data transmission with high urgencies, the resource is reliably allocated.

As described above, in accordance with the first embodiment, for the requests including the minimum bandwidths and the maximum bandwidths, the resources are allocated flexibly and effectively. When the resource cannot be ensured, the request can be made again automatically and simply. And, the resource is reliably allocated for the resource allocation request of data transmission with high urgency.

In accordance with the first embodiment, when the request for resource allocation is made, i) the resource is allocated for the request with higher reliability, ii) the resource is utilized more effectively, iii) the resource can be allocated later to the communication apparatus whose request for resource allocation is once rejected, and iv) the resource can be allocated with higher reliability for data transmission with high urgency.

The above construction and operation are only illustrative. To provide one of the plural effects described above, with construction associated with the effect, processing or operation is performed.

Figure 6:
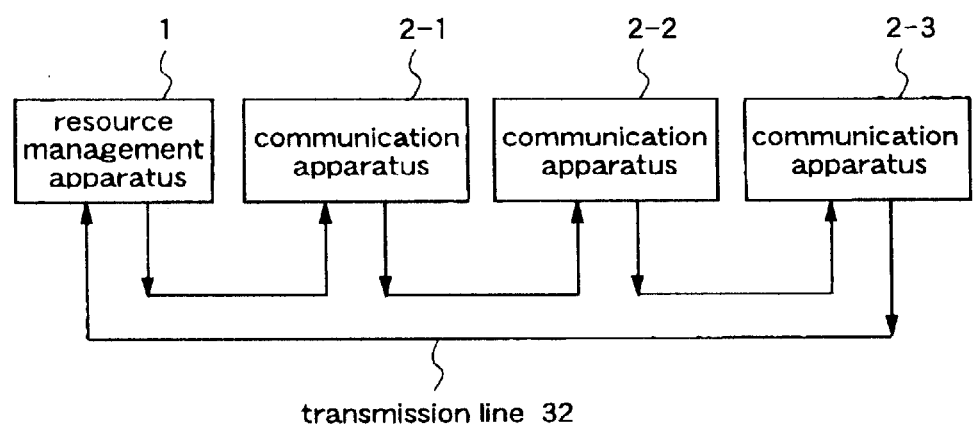
FIG. 6 is a diagram showing another example of the transmission system of the first embodiment.

While this embodiment is applied to data transmission using the transmission line on the bus and according to IEEE1394, it is applicable to a loop-type network shown in FIG. 6.

In addition, this embodiment is applicable to an arbitrary data transmission system using the isochronous communication channel which ensures the bandwidth, as a data transmission system other than the IEEE1394, for example, a MOST (media oriented synchronous transfer) system illustrated in "Patric heck, et al: "Media Oriented Synchronous Transfer—A network Protocol for High Quality, Low cost Transfer of Synchronous, Asynchronous, and Control Data on Fiber optics", Presented AES 103rd Convention, 1997 September, Preprint 4551. The MOST uses the loop-type transmission line shown in FIG. 6. According to the MOST, the transmission line is divided into a plurality of time slots with a fixed cycle, which are allocated to the communication apparatuses using the isochronous communication channel. The MOST differs from the IEEE1394 in that the resources stored in the storage means 22 of the MOST are time slots to-be-used and the resource management table 11 of the MOST contains information of allocated time slots and unallocated time slots.

As another example, there is "HiQOS-BUS" system illustrated in "On-Vehicle Multimedia Data Bus HiQOS-BUS" Matsushita Technical Journal, Vol144, No. 3, p125–132, June 1998" written by Sakai, et al. The HiQOS-BUS, uses the loop-type transmission line shown in FIG. 6. According to the HiQOS-BUS, the resource management apparatus 1 transmits tokens periodically according to the order of the resource management table 11, and a communication apparatus indicated by the token uses the token to perform data transmission, which is called a "modified token passing system". The communication control means 10 outputs tokens in the order according to the resource management table 11, while the communication control means 20 performs data transmission by using the token which can be used by the corresponding communication apparatus 2-1. This system is of a centralized management type, wherein timing at which the network resource is to be used according to the token output from the resource management apparatus 1. Each communication apparatus knows the resource used by itself according to the token. Using the HiQOS-BUS system, the storage means 22 is dispensed with, and the ACK for the bandwidth request command need not include the allocated bandwidth and the change notification. Therefore, processing associated with these becomes unnecessary.

While the resource allocation request includes the maximum bandwidth, the request to-be-transmitted may include a flag for identifying CBR or ABR. In this case, the resource management means 12 allocates available resources for the allocated-resource requests of the ABR (S21 and S42). When the flag indicates the CBR, it is decided that the value of the maximum bandwidth is equal to the value of the minimum bandwidth, while when the flag indicates the ABR, it is decided that the maximum bandwidth is infinite. Hence, the flag may be used as information indicating the maximum bandwidth.

As for the resource allocation request for the CBR, the minimum bandwidth and the maximum bandwidth are set such that they have the same value. Alternatively, it is possible to use an arbitrary resource allocation request including information for distinguishing between the ABR and the CBR, a fixed bandwidth for the CBR, and the minimum bandwidth and the maximum bandwidth for the ABR.

Further, in this embodiment, the resource management table 11 is not necessarily provided. Rather than using the resource management table 11, the actually allocated resources may be stored in the allocated-resource request table 13. Nevertheless, in the transmission system in which the resource management apparatus 1 informs each of the communication apparatuses of timing of transmission with reference to the resource management table 11, the resource management table 11 needs to be provided. In the transmission system in which communication apparatuses which set necessary resources in the resource management table 11 without the use of the resource management means 12 are present on the transmission line, the resource management table 11 is also necessary. When the resource management means 12 decides whether or not the resource is allocatable or actually allocates the resource, the resources set in the resource management table 11 by the resource management means 12 and available resources can be handled by the resource management means 12.

In the above description, the remaining resource allocation processes in S22 and S42 may be implemented by arbitrary methods. Additionally, several implementations for distributing the remaining resources according to priorities will be described below. In description below, a priority of each request "i" is expressed as "Pi". When priorities Pi are set to from "1" to "Pstep", the lowest is "1" and the highest is "Pstep". When the priorities are given in another representation, for instance, when the lowest is "Pstep-1" and the highest is "0", this may be transformed.

EXAMPLE 1

Figures 12, 13:
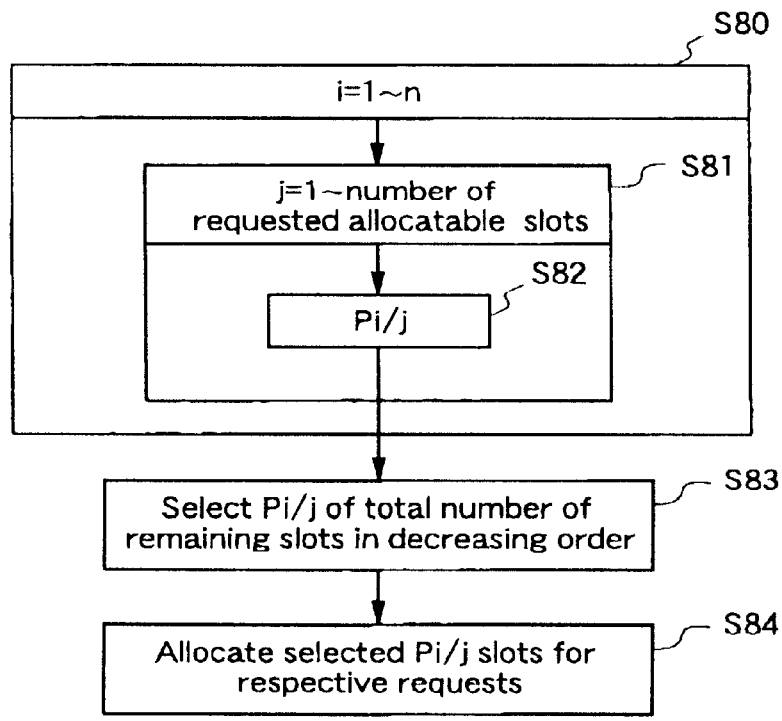
FIG. 12 is a diagram showing an example of a method for allocating an available (remaining) resource.
FIG. 13 is a diagram showing another example of the method for allocating the available (remaining) resource.

The first example is to determine bandwidths to-be-allocated, according to the priorities and quotients resulting from division of the priorities by natural numbers. This is explained with reference to FIGS. 12 and 13. In this method, for the Pi of each request i, Pi/j is calculated (S82). This calculation is performed on j=("1" to "the number of requested allocatable slots") (S81). The number of requested allocatable request slots refers to the number of the remaining and allocatable slots for the request i, and is found by subtracting the number of slots already allocated to the request i from the number of slots corresponding to the maximum bandwidth of the request. "j"="1 to the number of requested allocatable slots" is adopted, but "j"="1 to a fixed number" may be adopted. In FIG. 12, it is assumed that the number of allocatable slots is "5" for each request. This calculation is performed on for each request ("i"=1–n) (S80). Through the steps (S80–S82), the table shown in FIG. 12 is created. Then, "Pi/j" of a total number of the remaining slots are selected in the decreasing order(S83). The total number of the remaining slots is the number of slots corresponding to the remaining bandwidths allocatable on the transmission line. Since the total number of the remaining slots is "11" in the example shown in FIG. 12, 11 "P/j" underlined are selected. Finally, for respective requests i, the slots which is the same number as selected "pi/j" in S83 are allocated (S84). In the illustrated example shown in FIG. 12, for respective requests (i=1–5), "2", "1", "3", "0", and "5" slots are allocated, respectively.

EXAMPLE 2

The second example is to distribute slots in proportion to priorities. In this method, according to ((Pi/Pi)×(the total number of the remaining slots), slots to be distributed for the request are determined. The distributed slots are added, and thereby when the maximum bandwidth is exceeded, excess slots are distributed for the other requests.

EXAMPLE 3

The third example is to distribute slots in proportion to products of priorities and the numbers of requested allocatable slots. Assume that the number of requested allocatable slots is "RSi" for each of the requests "i". In this method, according to ((Pi×RSi)/(Pi×RSi))×(the total number of the remaining slots), the number of slots to-be-distributed for each of the request "i" is determined. The distributed slots are added, and thereby when the maximum bandwidth is exceeded, excess slots are distributed for the other requests.

As described above, since the remaining bandwidths are allocated according to the priorities, larger bandwidths are allocated for requests of higher priorities. These methods are only illustrative, and arbitrary methods for allocating relatively larger bandwidths for requests of higher priorities may be used.

Figure 11:
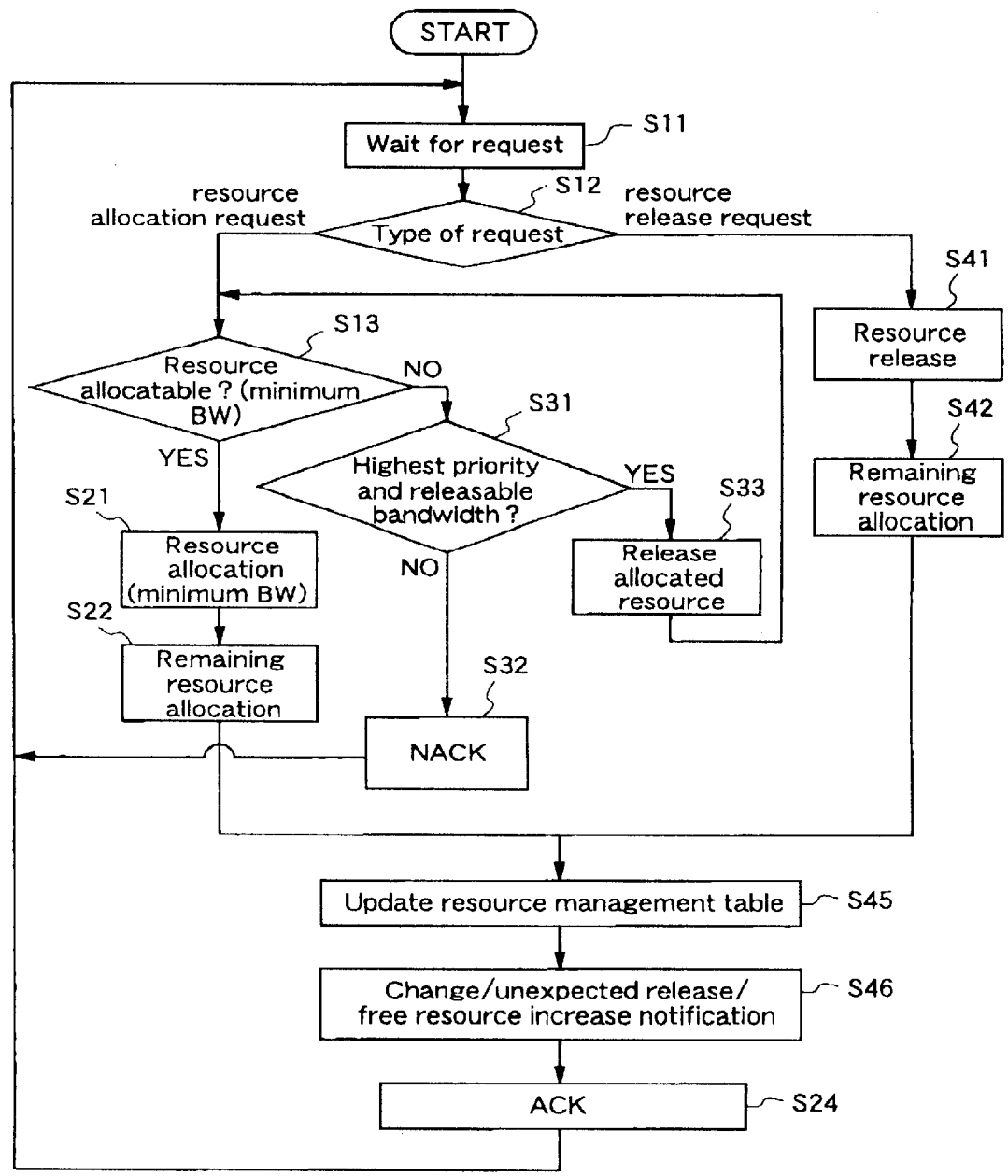
FIG. 11 is a flowchart showing another example of flow of processing performed by the resource management means of the first embodiment.

While the resource management means 12 performs processing along flow shown in FIG. 2, flow of processing is not limited to this. FIG. 11 shows another example of flow of processing. In FIG. 11, processing with the same step numbers shown in FIG. 2 is performed in the same manner. It should be noted that writing into the resource management table is not performed and, instead, the resource management table is created in work areas, in processing before S45. In S45, the resource management table in the work areas is applied to a real resource management table. Then, the notification of change/unexpected release/free resource increase is performed (S46). In S46, some processing of the change notification (S23), the unexpected release notification (S34), and the free resource increase notification (S44), are carried out. According to this, contents of the table is overwritten or various notifications are performed after the request is finally satisfied. Hence, if an error occurs in the middle, the table is not updated.

EMBODIMENT 2

Figure 7:
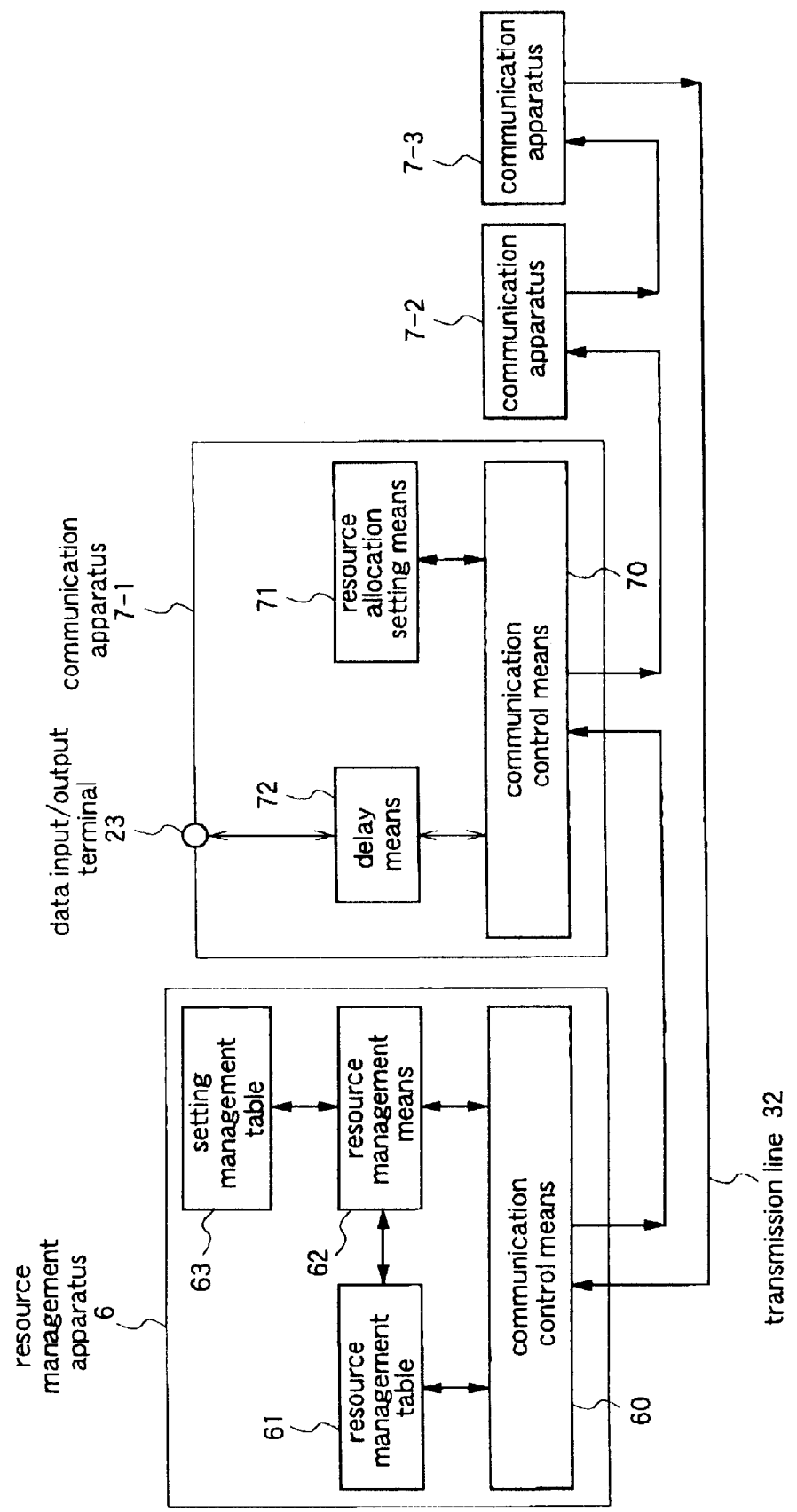
FIG. 7 is a diagram showing a transmission system according to a second embodiment of the present invention.

FIG. 7 is a diagram showing a transmission system according to a second embodiment of the present invention. In FIG. 7, reference numerals 32, 6, 60, 61, 62, and 63 denote a transmission line, a resource management apparatus, communication control means, a resource management table, resource management means, and a setting management table, respectively. Reference numerals 7-1, 7-2, and 7-3 denote communication apparatuses. Reference numerals 70, 71, 72, and 23 denote communication control means, resource allocation setting means, delay means, and a data input/output terminal, respectively.

This second embodiment relates to a transmission system according to HiQOS-BUS described in the first embodiment. The communication control means 60 and 70 are adapted to transmit data according to the HiQOS-BUS.

The resource allocation means 71 operates similarly to the resource allocation means of the first embodiment except that it stores no information in the storage means and need not process change notification. The resource management table 61 is used for managing time slots. Specifically, correspondences between time slots and communication apparatuses are managed by the resource management table 61. The setting management table 63 is handled similarly to the allocated-resource request management table 13. Hereinafter, operational difference between the system of the first embodiment and the system of the second embodiment, will be mainly described.

Each of the communication apparatuses includes the delay means 72. The delay means 72 is an FIFO (first-in first-out) memory. In the communication apparatus which performs data transmission, the delay means 72 receives data synchronized with a fixed clock, which is input via the data input/output terminal 23, and outputs the data at timing when the communication control means 70 can transmit the data. In the communication apparatus which receives data, the data received by the communication control means 70 is input to the delay means 72. Then, data that is half or more than half of a capacity of the delay means 72 is stored therein, the data is output via the data input/output terminal 23-1 in synchronization with the fixed clock. In this case, the fixed clock may be input externally or transmitted on the transmission line 32. It should be remembered that a rate of the fixed clock is equal to that of the data input via the data input/output terminal 23.

The resource management means 62 operates similarly to the resource management means 12 except processing for the resource allocation request of the CBR. Specifically, when the resource management means 62 decides that the time slots are allocatable in S13 (decision on resource allocation), the resource management means 62 allocates time slots necessary for the minimum bandwidths in free time slot positions of the resource management table 61, and confirms that actually transmitted data will not exceed data that is half of the capacity of the delay means 72 of the communication apparatus. When confirmed, it is decided that the resource is allocatable. In decision on resource allocation (S13) and resource allocation (S21), the allocatable time slots according to the above simulation decision process are allocated. The same goes for the allocated-resource request. The ABR is not limited to this.

Figure 8:
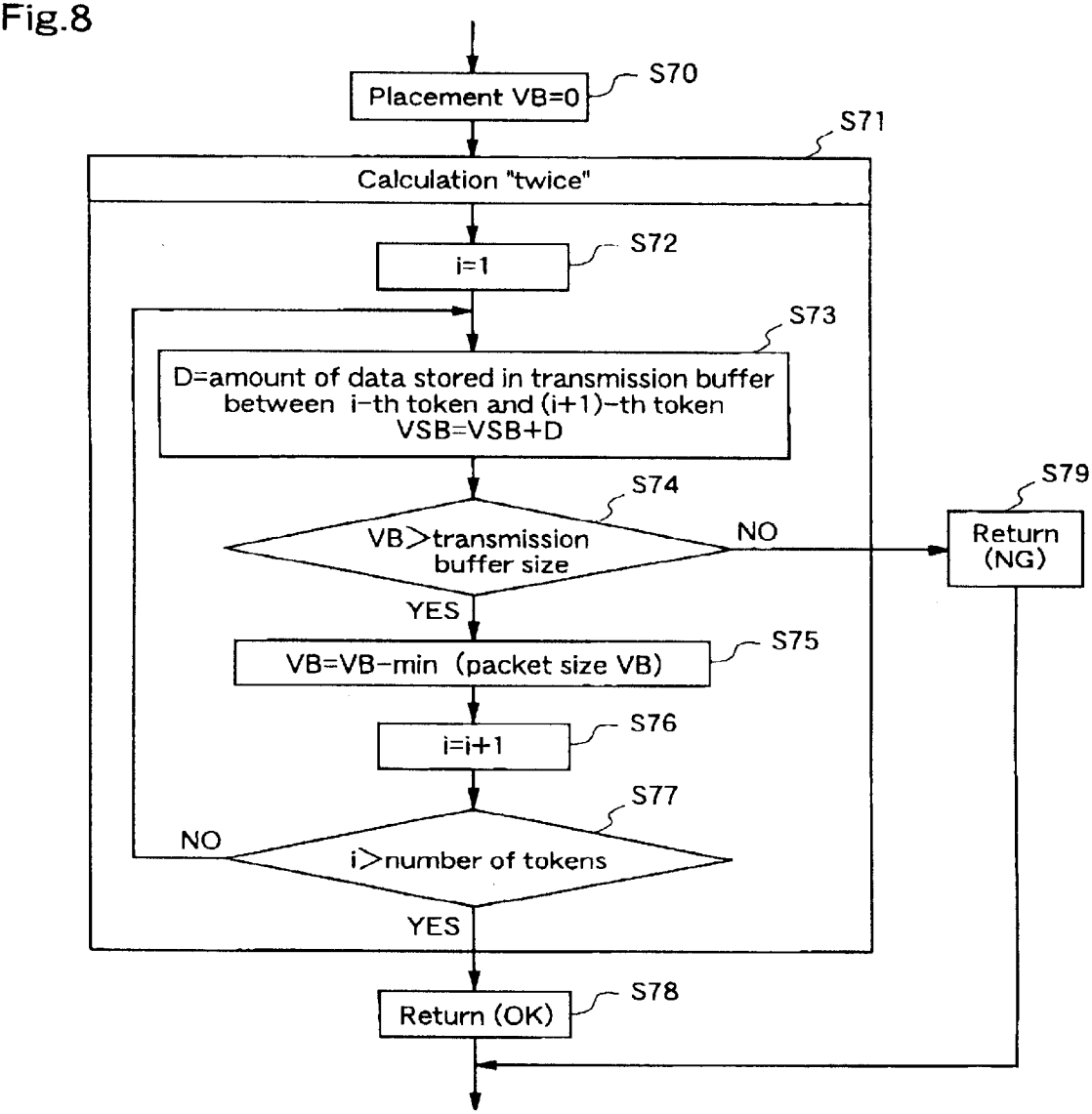
FIG. 8 is a flowchart showing processing performed by resource allocation means of the second embodiment.
Figure 9:
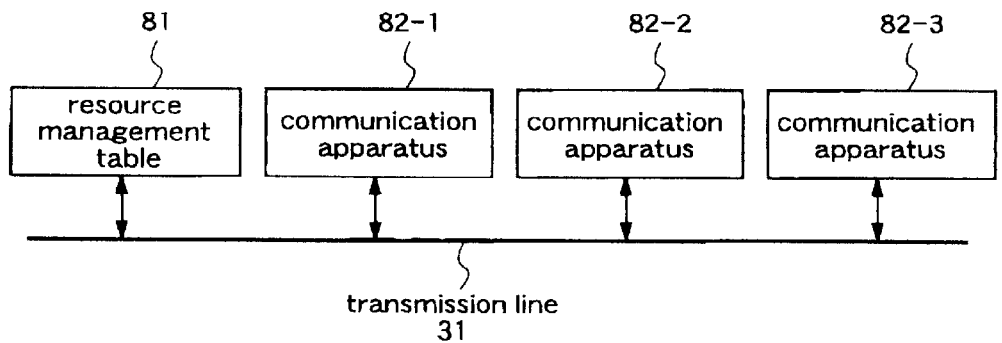
FIG. 9 is a diagram showing a conventional transmission system.
Figure 10:
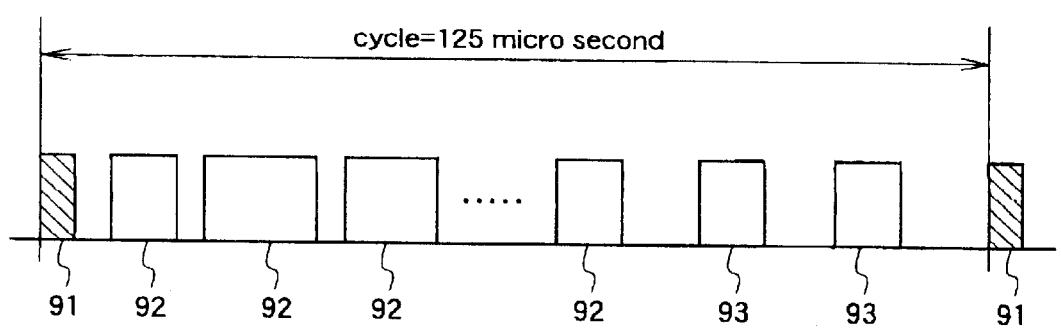
FIG. 10 is a diagram showing a data format according to a conventional transmission method.

FIG. 8 shows a flowchart of the simulation decision process. Initially, placement of the time slots is determined and a variable "VB" is set to "0" (S70). S71 comprising S72, S73, S74, S75, S76, and S77 is repeated twice. In S72, a variable "i" is set to "1". In S73, "D" is calculated. The "D" is the amount of data stored in a transmission buffer between an i-th allocated token and an (i+1)-th allocated token. The calculated D is added to the variable "VB" (S73), and the resulting VB is compared to a transmission buffer size (it is decided whether or not the VB is larger than the transmission buffer size) (S74). The transmission buffer size is half of the capacity of delay means 72. When decided "No" in S74, the decision result is "NG" and processing is completed (S79). When decided "Yes" in S74, the smaller of the two (packet size, VB) is subtracted from the 178, to obtain a VB (S75). Then, "1" is added to the variable "i" to obtain an i" (S76). It is decided whether or not "i" is larger than the number of allocated tokens(S77), and when decided "Yes" in S77, the decision result is "OK" and processing is completed (S78). When decided "No" in S77, calculation on all the allocated tokens is not completed, and therefore, S73 is performed again.

Apparently, at a transmission end, for every allocated token, the delay means 72 of the communication apparatus which is about to perform transmission according to a next token will not overflow. At a receiving end, after data that is half of the capacity of the delay means 72 is stored therein, the data is output according to the fixed clock. Assuming that the amount of data that is half of the capacity of the delay means 72 is "SB", the SUM of the data stored in the delay means 72 of the communication apparatuses at the transmission end and the receiving end at that point of time, is expressed as:

$$SB \leq SUM \leq 2*SB$$

Since the amount of data input to the delay means 72 at the transmission end is equal to the amount of data output from the delay means 72 at the receiving end, the SUM remains unchanged, and only the balance between the transmission end and the receiving end varies. As a result, the delay means 72 at the receiving end will not overflow, either. The processing is repeated twice as mentioned previously, because it is necessary to confirm that no problem arises when which of tokens in the token table is to be first used for data transmission, is not known.

Thus in accordance with the second embodiment, it is possible to realize a transmission system, a resource (bandwidth) management apparatus, and a resource (bandwidth) management method, which are capable of compensating for variances of arrival times of data due to data transmission by using smaller buffers.

While in this embodiment the delay means 72 of all the communication apparatuses are equal in size, the size of the delay means 72 of the communication apparatus at the receiving end may double that of the delay means 72 of the communication apparatus at the transmission end, thereby reducing memories In this case, in S74, as the transmission buffer size, the size of the delay means 72 of the communication apparatus at the transmission end may be used.

EMBODIMENT 3

A bandwidth management method according to a third embodiment will be described with reference to FIGS. 14 to 16.

The bandwidth management method of the third embodiment is applied to the resource (bandwidth) management apparatus and the transmission system of the first embodiment. More specifically, there is illustrated another example of the method for releasing allocated bandwidths in S33 of the first embodiment.

FIG. 14 shows an example of an allocated-resource request table. In this shown example, apparatus IDs (AIDi) and sequence numbers (SQi) are added to the allocated-resource request table (see FIG. 4) of the first embodiment. The apparatus IDs is information included in the corresponding bandwidth allocation request, indicating a set of the apparatus ID of the transmission apparatus and the apparatus ID of the receiving apparatus which uses the bandwidth allocated according to the request. For example, there is a set of the apparatus ID of a CD drive and the apparatus ID of a CD decoder, or a set of a broadcast receiving tuner ID and an apparatus ID of a decoder. The apparatus ID is an ID by which each apparatus is uniquely identifiable, which can be added arbitrarily. By way of example, it may be embedded when manufactured or may be set by a user. When plural apparatuses use the bandwidth, plural apparatus IDs are included therein.

The sequence numbers SQi are numbers, by which the order in which bandwidths are allocated is known. The sequence numbers can be added arbitrarily, provided that the order of bandwidth allocation is known. By way of example, numbers are sequentially added when the bandwidths are allocated until the maximum number is reached, unused numbers in the middle are used to conduct renumbering.

Figure 15:
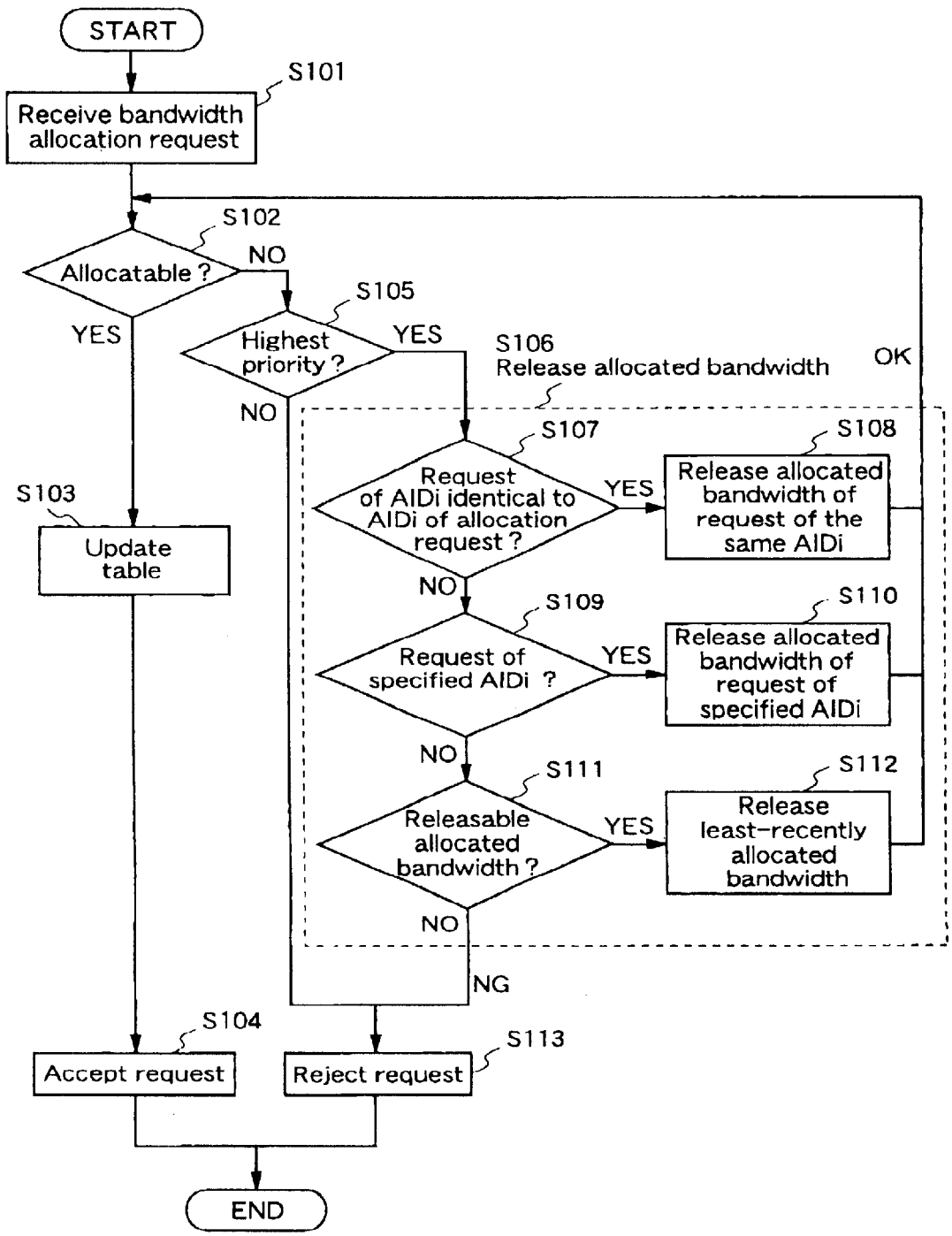
FIG. 15 is a flowchart showing processing according to a bandwidth management method according to a third embodiment of the present invention.

FIG. 15 is a flowchart showing processing according to the bandwidth management method of the third embodiment, and showing processing performed by the bandwidth (resource) management means 12 when it receives a bandwidth allocation request.

The bandwidth management means 12 receives a bandwidth allocation request including a requested bandwidth (resource), a priority, and an apparatus IDs, from the bandwidth (resource) allocation means 21 (S101). While the requested resource comprises the requested maximum bandwidth and the requested minimum bandwidth like the first embodiment, it may include at least the requested minimum bandwidth. The bandwidth management means 12 decides whether or not the requested bandwidth of the bandwidth allocation request is allocatable (S102). When it decides that the requested bandwidth is allocatable, the bandwidth management means 12 allocates the bandwidth, and adds a sequence number indicating that the corresponding request is the most recent, to update the allocated-resource request table (S103). Then, the bandwidth management means 12 sends "ACK" to the bandwidth allocation means 21, to notify it that the request has been accepted.

When the bandwidth is not allocated in S102, the bandwidth management means 12 decides whether or not the priority of the request is the highest (S105). Alternatively, it may decide whether or not the priority is higher than a predetermined value. When it decides that the priority is not the highest in S105, the bandwidth management means 12 sends the "NACK" to the bandwidth allocation means 21, to notify it that the request has been rejected (S113).

When it decides that the priority is the highest in S105, the bandwidth management means 12 releases one or more allocated bandwidths (s106). Hereinafter, processing in S106 will be described in more detail.
S106
Initially, an allocated-bandwidth request having an AIDi (apparatus ID) which is identical to the AIDi of the bandwidth allocation request and having a priority other than the highest priority is searched among the contents stored in the allocated-resource request table 13 (S107). If found, the allocated bandwidth of the allocated-resource request is released and unexpected release notification is performed. (S108). Then, decision on whether or not allocation is possible (S102) is repeated.

If not found in S107, an allocated-bandwidth request having a specified AIDi and having a priority other than the highest priority is searched among the contents stored in the allocated-resource request table 13 (S109). If found in S109, the allocated bandwidth of the allocated-resource request is released and unexpected release notification is performed (S110). Then, decision on whether or not allocation is possible (S102) is repeated.

If not found in S109, an allocated-resource request of a priority other than the highest priority, i.e., a request of a releasable allocated-bandwidth is searched among the contents in the table 13 (S111). If releasable allocated-bandwidths are found S111, comparison is made among the corresponding sequence numbers, to select the request of the least-recently allocated bandwidth, and then this allocated bandwidth is released and unexpected release notification is performed (s112). Then, decision on whether or not allocation is possible (S102) is repeated. If not found in S111, the "NACK" is sent, to notify the bandwidth allocation means that the request has been rejected (S113).

In summary, in S106, the allocated bandwidths are released in the order as follows:
(1) the allocated-resource request having the same AIDi as the bandwidth allocation request (S107, S108)
(2) the allocated-resource request having the specified AIDi (S109, S110)
(3) the allocated-resource request of the sequence number of the least-recently allocated bandwidth (S111, S112). The processing in S106 is not limited to the flow shown in FIG. 15, and is implemented following arbitrary flow which implements this processing likewise.

Figure 16:
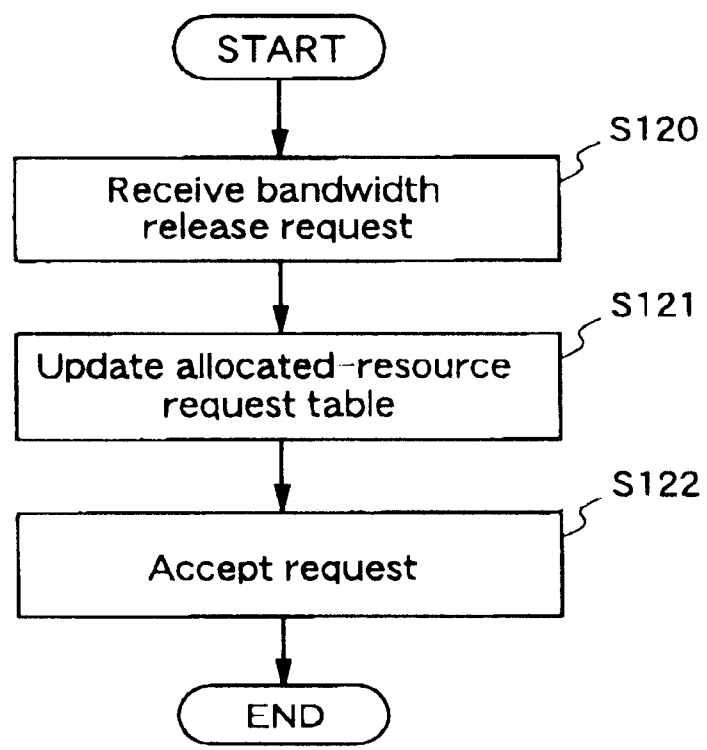
FIG. 16 is a diagram showing processing performed when a bandwidth release request is received, according to the bandwidth management method of the third embodiment.

FIG. 16 shows processing performed when the bandwidth release request is received. The bandwidth release request is received (S120). The allocated bandwidth of the allocated-resource request indicated by this request is released, and the allocated-resource request table 13 is updated (S121). In this case, like the first embodiment, by sending "free bandwidth increase notification", the same effects provided by the first embodiment are achieved.

As should be appreciated from the forgoing, if the bandwidth cannot be ensured for the bandwidth allocation request of a high priority, the allocated bandwidth of the allocated-resource request is forcibly released, thereby allocating the bandwidth for the bandwidth allocation request.

When the allocated bandwidth of the allocated-resource request is forcibly released, in S107 and S108, the allocated bandwidth relating to the apparatuses indicated by the bandwidth allocation request is released. Thereby, without practically affecting services to users, the allocated bandwidth can be forcibly released. Here, a set of apparatuses which use the bandwidth is called an "application". Consider a case where an application which performs urgent broadcast by using a display and a speaker, makes a bandwidth allocation request of a high priority. In this case, when another application such as TV or car navigation by which the display or the speaker is being used, exists, the bandwidth allocated to the existing application is released. Processing in S107 and S108 is not limited to the above. In a case where bandwidths are in short and the existing application and an application making a bandwidth allocation request of a higher priority demand to use the same equipment resources (display, speaker, etc), the allocated bandwidth of the existing application is released, whereby the same effects are provided.

In S109 and S110, the allocated bandwidth relating to the specified apparatus is released. This enables to select the apparatus using the allocated bandwidth which is to be forcibly released. The processing S109 and S110 are not limited to the above. The same effects are provided by construction in which a bandwidth allocated to a fixed apparatus is released.

In S111 and S112, the allocated bandwidth is released in the order from least to most recent. For the user, the request of the most recently allocated bandwidth, i.e., the most recent application, is relatively important and effective. This is highly effective to a transmission system for car or home which would be used by one or a small number of users. This is also effective to a case where there is an application which ends without releasing its allocated bandwidth. The processing in S111 and S112 are not limited to the above. The same effects are provided by an arbitrary construction in which allocated bandwidth is released in the order from least to most recent.

Thus, in accordance with the third embodiment, it is possible to construct a transmission system in which the bandwidth is always allocated for the band allocation request of the high priority. The bandwidth is forcibly released according to a method which is convenient for the user.

In the above processing, (1) release of the allocated bandwidth relating to the apparatuses which demand to use the same equipment (S107 and S108), (2) release of the bandwidth allocated for the specified apparatus (S109, S110), and (3) release of the allocated bandwidth from least to most recent, are performed in this order. Alternatively, the order of (1) and (2) may be arbitrary. In addition, the processing may be implemented by one of them or by combination of two of them, in which case, the same effects are achieved.

While in the above description, the allocated bandwidth is released in the order from least to most recent (S111 S112), this may be released in the order of ascending priorities.

As described above, for the request whose priority is decided to be the highest in S105, the allocated bandwidth is forcibly released to allocate this for the request without fail. The decision on the priority in S105 can be made by various methods. The simplest method is to make comparison among numbers.

The highest priority at least may include an authenticator indicating that its value is correct. In this casei only the priority which is confirmed that it is correct according to the authenticator may be accepted. The authenticator is arbitrary information relating to a normal user or apparatus, including a pass word input by the user or embedded in the apparatus, or a signature according to an encryption system. According to this method, by setting the priority unfairly higher, the fact that an application with lower urgency or importance always tries to ensue the bandwidth, is avoided. Setting the priority unfairly higher is advantageous to a transmission system utilized by many users, although this is not to a small-scale transmission system utilized by a small number of users.

The newly allocated bandwidth resulting from forcible release of the allocated bandwidth, may be forcibly released after specified time elapses. In this case, the bandwidth allocation means is adapted to transmit a bandwidth allocation request of the highest priority including allocation time.

The bandwidth management means is adapted to forcibly release the allocated bandwidth of an allocated-resource request and forcibly release the allocated bandwidth of the request for which S106 is performed, after the allocation time. Thereby, for the request of the forcibly released allocated bandwidth, the bandwidth is always reallocatable after the specified time elapses.

What is claimed is:

1. A transmission system comprising a transmission line, a communication apparatus connected to the transmission line, and a bandwidth management apparatus for managing bandwidths on the transmission line, wherein the communication apparatus, when performing isochronous data transmission by using an allocated resource on the transmission line, outputs a resource allocation request including information indicating a minimum bandwidth and a maximum bandwidth to the bandwidth management apparatus before the isochronous data transmission, and wherein the bandwidth management apparatus includes an allocated-resource request table for storing plural allocated-resource requests; and resource management means which decides whether or not a sum of minimum bandwidths of all allocated-resource requests stored in the allocated-resource request table and a minimum bandwidth of the resource allocation request is allocatable from resources on the transmission line when receiving the resource allocation request as an input, allocates a resource for each of the all allocated-resource requests and the resource allocation request such that a bandwidth between a corresponding minimum bandwidth and a corresponding maximum bandwidth is allocated when deciding that the sum is allocatable, and writes the minimum bandwidth and an allocated bandwidth of the resource allocation request in the allocated-resource request table as an allocated-resource request.

2. The transmission system of claim 1, wherein the resource management means, when an allocated resource of at least one allocated-resource request stored in the allocated-resource request table is released, reallocates a free resource for each of the allocated-resource requests other than the at least one allocated-resource request with the allocated resource released such that a bandwidth which is not larger than a corresponding maximum bandwidth is obtained.

3. The transmission system of claim 1, wherein the resource management means, when allocating the resource such that the bandwidth between the corresponding minimum bandwidth and the corresponding maximum bandwidth is allocated, performs control so that a ratio of an allocated bandwidth to a corresponding maximum bandwidth for a first request of a priority is higher than a ratio of an allocated bandwidth to a corresponding maximum bandwidth for a second request of a priority lower than the priority of the first request.

4. A transmission system comprising a transmission line, plural communication apparatuses connected to the transmission line, and a bandwidth management apparatus for managing bandwidths on the transmission line, wherein a communication apparatus included in the plural communication apparatuses, when performing isochronous data transmission by using an allocated resource on the transmission line, outputs a resource allocation request to the bandwidth management apparatus before the isochronous data transmission, and outputs the resource allocation request again upon receipt of a free resource increase notification, when a negative acknowledgement is sent to the communication apparatus in response to the resource allocation request, and wherein the bandwidth management apparatus manages resources on the transmission line, sends the negative acknowledgement to the communication apparatus when resource allocation for the resource allocation request from the communication apparatus is impossible, and notifies all the communication apparatuses that free resources are increased, by broadcast, when the allocated resource is released.

5. A transmission system comprising a transmission line, plural communication apparatuses connected to the transmission line, and a bandwidth management apparatus for managing bandwidths on the transmission line, wherein a communication apparatus included in the plural communication apparatuses, when performing data transmission by using an allocated resource on the transmission line, outputs a resource allocation request including a priority to the bandwidth management apparatus before the data transmission, and wherein the bandwidth management apparatus manages resources on the transmission line in such a way that it releases resources allocated for other communication apparatuses and allocates the resources for the resource allocation request, when resource allocation for the resource allocation request from the communication apparatus is impossible and the priority of the resource allocation request is the highest.

6. The transmission system of claim 5, wherein
the resource allocation request includes an identifier indicating a communication apparatus which uses an allocated resource for itself, and wherein the bandwidth management apparatus releases the resources allocated for other communication apparatuses such that it releases an allocated resource being used by a communication apparatus having an identifier identical to the identifier included in the resource allocation request.

7. The transmission system of claim 5, wherein
the bandwidth management apparatus releases the resources allocated for other communication apparatuses in the order in which the resources were allocated.

8. The transmission system of claim 5, wherein
the bandwidth management apparatus releases the resources allocated for other communication apparatuses in the order of ascending priorities included in respective resource allocation requests.

9. The transmission system of claim 5, wherein
the resource allocation request includes allocation time information indicating a time when the resource allocated for the resource allocation request is to be used, and wherein the bandwidth management apparatus forcibly releases the resource allocated for the resource allocation request after the time indicated by the allocation time information elapses.

10. The transmission system of claim 5, wherein
the bandwidth management apparatus notifies all the communication apparatuses that free resources are increased, by broadcast, when an allocated resource is released.

11. A bandwidth management apparatus for managing resources on a transmission line and processing a resource allocation request including information indicating a minimum bandwidth and a maximum bandwidth, said bandwidth management apparatus comprising:

an allocated-resource request table for storing plural allocated-resource requests; and resource management means which decides whether or not a sum of minimum bandwidths of all allocated-resource requests stored in the allocated-resource request table and a minimum bandwidth of the resource allocation request is allocatable from the resources on the transmission line when receiving the resource allocation request as an input, allocates a resource for each of the all allocated-resource requests and the resource allocation request such that a bandwidth between a corresponding minimum bandwidth and a corresponding maximum bandwidth is allocated when deciding that the sum is allocatable, and writes the minimum bandwidth and an allocated bandwidth of the resource allocation request in the allocated-resource request table as an allocated-resource request.

12. A bandwidth management apparatus for managing resources on a transmission line and processing a resource allocation request, comprising:

means for broadcasting a free resource increase notification through the transmission line when an allocated resource is released.

13. A bandwidth management apparatus for managing resources on a transmission line and processing a resource allocation request including a priority, comprising:

means which releases an allocated resource when resource allocation for the resource allocation request is impossible and the priority of the resource allocation is the highest, and performs resource allocation for the resource allocation request.

14. A bandwidth management method for managing resources on a transmission line by using an allocated-resource request table for storing plural allocated-resource requests, said method comprising the steps of:

deciding whether or not a sum of minimum bandwidths of all allocated-resource requests stored in the allocated-resource request table and a minimum bandwidth of the resource allocation request is allocatable from the resources on the transmission line when receiving the resource allocation request as an input; and allocating a resource for each of the all allocated-resource requests and the resource allocation request such that a bandwidth between a corresponding minimum bandwidth and a corresponding maximum bandwidth is allocated when deciding that the sum is allocatable, and writing the minimum bandwidth and an allocated bandwidth of the resource allocation request in the allocated-resource request table as an allocated-resource request.

15. A bandwidth management method for managing resources on a transmission line to which plural communication apparatuses are connected, wherein when an allocated resource is released, all of the plural communication apparatuses are notified by broadcast that free resources are increased.

16. A bandwidth management method for managing resources on a transmission line, comprising:

an allocation decision step for deciding whether or not a resource is allocatable for a resource allocation request when receiving the resource allocation request including a priority as an input;

a priority decision step for deciding whether or not the priority of the resource allocation request is not smaller than a predetermined value when it is decided that the resource is not allocatable for the resource allocation request in the allocation decision step; and a release step for releasing an allocated resource when the priority is not smaller than the predetermined value, and returning to the allocation decision step.

* * * * *

UNITED STATES PATENT AND TRADEMARK OFFICE
CERTIFICATE OF CORRECTION

PATENT NO.   : 6,590,865 B1
DATED        : July 8, 2003
INVENTOR(S)  : Susumu Ibaraki, Toshikazu Hattori and Toshihiko Kurosaki It is certified that error appears in the above-identified patent and that said Letters Patent is hereby corrected as shown below:

Title page,
Item [63], Foreign Application Priority Data, please change "Aug. 4, 1999" to -- Aug. 4, 1998 --.

Signed and Sealed this

Nineteenth Day of July, 2005

JON W. DUDAS
*Director of the United States Patent and Trademark Office*